Figure 1:
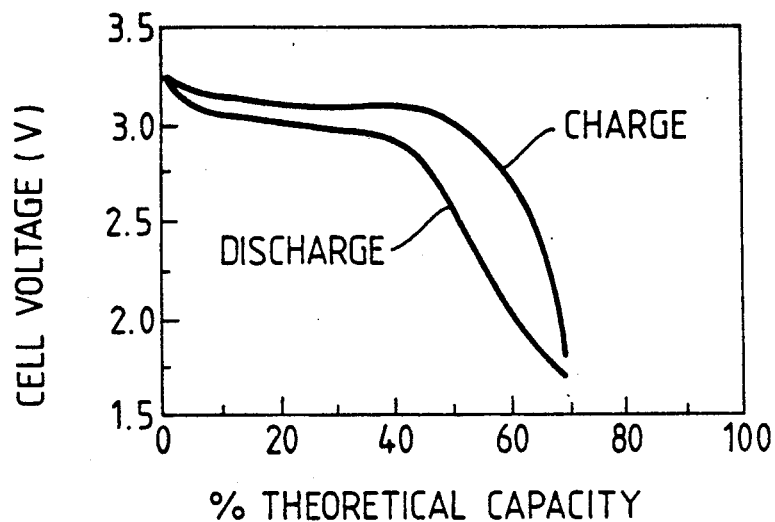

United States Patent [19]

Neat et al.

[11] Patent Number: 5,030,523

[45] Date of Patent: Jul. 9, 1991

[54] ELECTROCHEMICAL CELL MANUFACTURE

[75] Inventors: Robin J. Neat, Kennington; Raymond J. Powell, Newbury, both of England

[73] Assignee: United Kingdom Atomic Energy Authority, London, England

[21] Appl. No.: 450,083

[22] Filed: Dec. 13, 1989

[30] Foreign Application Priority Data

Dec. 14, 1988 [GB] United Kingdom ............. 8829118

[51] Int. Cl.$^5$ ..................... H01M 4/04; H01M 4/50
[52] U.S. Cl. ................................. 429/50; 429/192; 429/224; 29/623.1
[58] Field of Search ............ 429/50, 192, 224; 29/623.1

[56] References Cited

U.S. PATENT DOCUMENTS

| | | |
|---|---|---|
| 4,405,699 | 9/1983 | Kruger . |
| 4,547,440 | 10/1985 | Hooper et al. ............. 429/112 |
| 4,758,484 | 7/1988 | Furukawa . |

FOREIGN PATENT DOCUMENTS

| | | |
|---|---|---|
| 0165827 | 12/1985 | European Pat. Off. . |
| 0370684 | 5/1988 | European Pat. Off. . |
| 0279235A1 | 8/1988 | European Pat. Off. . |
| 0307209 | 3/1989 | European Pat. Off. . |
| 258308 | 7/1988 | German Democratic Rep. . |
| 2122412A | 1/1984 | United Kingdom . |
| 2196785A | 5/1988 | United Kingdom . |

OTHER PUBLICATIONS

*Preliminary Results on Synthesis and Characterization of $Li_x MnO_2$* by Ohzuku et al., (Chemistry Express, vol. 4, No. 12, 1989).
*Electrochemistry of Manganese Dioxide in Lithium Non-Aqueous Cell* by Ohzuku et al., (J. Electrochem. Soc., vol. 136, No. 11, 1989).
*Manganese Dioxide as a Rechargeable Cathode* by R. J. Neat et al., (presented at Conference in Siena, Italy in Jun. 1989).

*Primary Examiner*—Donald L. Walton
*Attorney, Agent, or Firm*—Larson and Taylor

[57] ABSTRACT

A secondary electrochemical cell is made by
(i) assembling a solid state electrochemical cell having an anode containing an alkali metal such as lithium as active anode material; a solid alkali metal ion conducting electrolyte, for example a polymer electrolyte comprising a complex of a solid polymer (e.g. poly(ethylene oxide)) and an alkali metal salt (e.g. $LiClO_4$), which polymer is capable of forming donor-acceptor type bonds with alkali metal ions; and a cathode containing manganese (IV) oxide as active cathode material; and
(ii) discharging the cell under conditions, e.g. of elevated temperature, such that the cathode material is transformed in situ into a rechargeable cathode material which may, for example be $LiMn_2O_4$.

10 Claims, 1 Drawing Sheet

ELECTROCHEMICAL CELL MANUFACTURE

This invention relates to a method of making a secondary electrochemical cell.

Manganese(IV) oxide ($MnO_2$) is known as a primary cathode material for electrochemical cells but is reported to have only limited recharge capacity. The present invention is based on the finding that, when an electrochemical cell including $MnO_2$ as cathode material is fabricated in the charged state and subsequently discharged, the resulting cell can behave as a secondary cell.

Thus, the invention provides a method of making a secondary electrochemical cell comprising (i) assembling a solid state electrochemical cell having an anode containing an alkali metal as active anode material; a solid alkali metal ion conducting electrolyte and a cathode containing manganese(IV) oxide as active cathode material; and (ii) discharging the cell under conditions such that the cathode material is transformed in situ into a rechargeable cathode material.

In specific examples of the invention, to be described hereinafter, the resulting cell has surprisingly been found, at elevated temperature, to be capable of being recharged and subsequently discharged and to be repeatedly capable of being recharged and discharged without loss of capacity after the first discharge cycle.

In step (i), the cell may, for example, be made in the form of layers, such as films, of the anode, electrolyte and cathode constituting a flexible sandwich arrangement. This may be done, for example, by stacking, rolling or folding flexible layers into a required configuration which is then contained in a flexible package or casing and terminals provided so that the cell can be discharged in step (ii).

In step (ii), the conditions under which the cathode material is transformed are most preferably those of elevated temperature, such as in the range of 100° C. to 150° C.

The components of the cell used in and resulting from the present invention will now be described in greater detail.

ANODE

The anode may be fabricated entirely of the alkali metal, eg lithium (which is preferred), sodium or potassium, as such or of a form thereof (eg an alloy or mixture) from which the metal can be electrochemically released when the cell is discharged. If desired, the active anode material may be carried by an underlying structure of support material.

ELECTROLYTE

The electrolyte may, for example, be a solid polymer electrolyte comprising a complex of a solid polymer and an alkali metal salt, which polymer is capable of forming donor-acceptor type bonds with alkali metal ions and is capable of conducting alkali metal ions.

Such electrolytes are known in the art and described in, for example, EP-A-0 013 199 (corresponding to U.S. Pat. No. 4,303,748) and GB-A-2 139 410 (corresponding to U.S. Pat. No. 4 547 440). Examples are complexes of plastic macromolecular materials such as poly(ethylene oxide) and referred to herein as PEO, and poly(propylene oxide) with an alkali metal salt, preferably a lithium salt, the anion of which may, for example, be $I^-$, $Br^-$, $ClO_4^-$, $SCN^-$ or $F_3CSO_3^-$.

CATHODE

The $MnO_2$ used in the cathode of the cell in step (i) may be commercially available battery grade $MnO_2$ for primary cells. Preferably, the cathode is constructed as a composite structure comprising $MnO_2$, solid alkali metal ion conducting polymer electrolyte material as used in the electrolyte as such, and, if required, an electronically conducting medium such as graphite.

It is postulated that, in step (ii), the $MnO_2$ structure is rearranged due to entry of alkali metal (eg lithium) to generate the spinel compound $MMn_2O_4$, where M is alkali metal, and that the spinel compound endows the cell with secondary cell characteristics. $LiMn_2O_4$ is, in fact, known for use as a cathode in secondary cells: see, for example GB-A-2 122 412, GB-A-2 196 785, and EP-A-0 279 235. However, none of the above describes making the $LiMn_2O_4$ in situ electrochemically.

Figure 2:
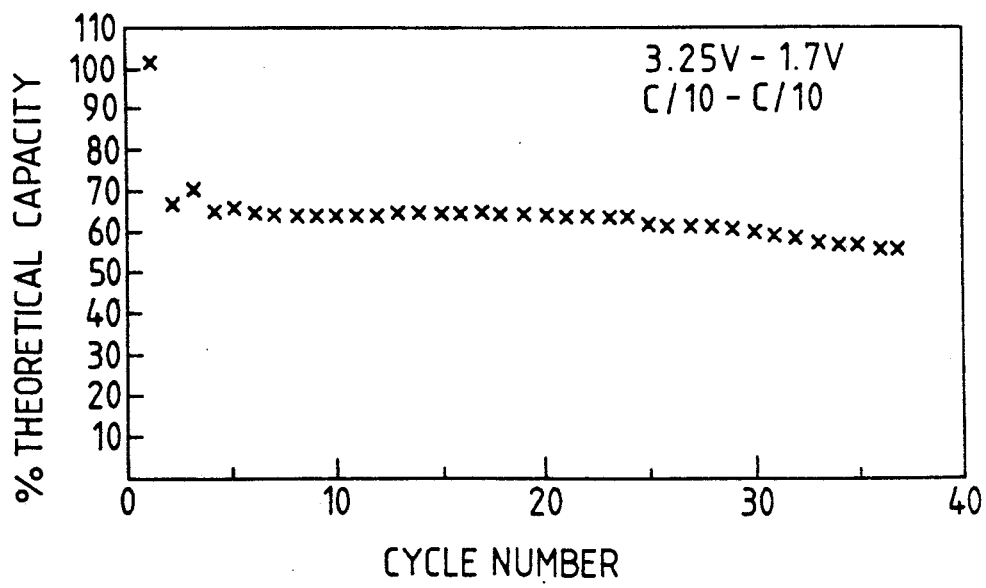

The invention will now be exemplified as follows wherein reference will be made to the accompanying drawings in which FIG. 1 is a graph of cell voltage against percentage theoretical capacity for the fourth discharge and charge of a cell made by the, method of the invention; and FIG. 2 is a graph of percentage theoretical capacity against cycle number for a cell made by the method of the invention.

EXAMPLE (i) Fabrication of Cell Components and Cell Composite Cathode

Battery grade $MnO_2$ was dried under partial pressure (c.$10^{-2}$ torr) for 14 h at 170° C. The $MnO_2$ (22.62 g), Ketjenblack carbon (1.10 g), acetone (120 ml) and three drop of Span 80 wetting agent were ball milled in a 250 ml pot containing four large and sixteen small alumina balls for 2.5 h. PEO (3.00 g; Union Carbide; m.w. 4,000,000) was added to the pot and ball milling continued for an additional 10 mins. $LiClO_4$ (1.21 g) and acetonitrile (120 ml) were then added and the mixture ball milled for 1 h.

The mixture was cast onto nickel foil, to act as current collector in the cell, by doctor blade solvent casting using a 0.5 mm blade. The resulting composite cathode was about 43 micrometers thick with a capacity of about 1.0 mA h $cm^{-2}$ based on a value of 308 mA h $g^{-1}$ for $MnO_2$. The composition of the electrolyte in the composite cathode was $PEO_{12}:LiClO_4$.

The above preparation was performed in the open laboratory under normal atmospheric conditions. The composite cathode was transferred to a dry room (T=20° C., dew point temperature −30° C.) for final drying over several days and fabricating into a cell (see below).

Electrolyte

A polymer electrolyte for use as the cell electrolyte was made by doctor blade solvent casting, using a 0.5 mm blade, a mixture of $LiClO_4$ (1.21 g) and acetonitrite 120 ml) that had been ball milled for 1 h. The mixture was cast onto silicone release paper to give an electrolyte of composition $PEO_{12}:LiClO_4$.

The preparation and transfer of the electrolyte were performed under the same conditions as described for the composite cathode.

Anode

A piece of lithium foil (ex Lithco; 40.0 $cm^2$; 150 micrometers) was rolled onto a similar sized piece of nickel foil to act as an anode current collector.

Cell

A piece of the above dried composite cathode (9 cm×6; 54 cm$^2$) was cut using a sharp blade. The cathode was weighed and rolled, its thickness being measured before and after rolling. Six of the above electrolyte layers (14 micrometers) of similar area were placed over the cathode and the components were vacuum laminated together at elevated temperature. The above anode was placed on the electrolyte and the complete cell vacuum laminated together at elevated temperature. The edges of the cell were insulated with high temperature insulating tape to prevent possible shorting, and the cell vacuum packed using standard packaging materials.

(ii) Discharge of Cell

The cell was placed in an oven at 120° C. and connected to a cell cycling rig and allowed discharged at the C/10 rate using constant current.

(iii) Testing of Discharged Cell

The cell was charged at constant current at the C/10 rate to an upper voltage limit of 3.25 V. The cell took a large degree of charge and was able to deliver about 60% of the theoretical discharge capacity on the second discharge cycle. Subsequent cycling under the same conditions indicated a minimal loss in discharge capacity over the next twenty cycles. Referring to FIG. 1, the fourth discharge and charge cycle of the cell are shown. Referring to FIG. 2, after the initial forming discharge, little or no decline in capacity over the subsequent twenty cycles is shown. The testing was performed at 120° C.

We claim:

1. A method of making a secondary electrochemical cell comprising
   (i) assembling a solid state electrochemical cell having an anode containing an alkali metal as active anode material, a solid alkali metal ion conducting electrolyte, and a cathode containing manganese (IV) oxide as active cathode material; and
   (ii) discharging the cell under conditions of elevated temperature in the range of 100° C. to 150° C. such that the cathode material is transformed in situ into a rechargeable cathode material comprising the spinel compound MMn$_2$O$_4$ where M is alkali metal.

2. A method according to claim 1 wherein the electrolyte comprises a complex of a solid polymer and an alkali metal salt, which polymer is capable of forming donor-acceptor type bonds with alkali metal ions and is capable of conducting alkali metal ions.

3. A method according to claim 2 wherein the complex is a complex of a plastic macromolecular material and an alkali metal salt.

4. A method according to claim 1 wherein the cathode is constructed as a composite structure comprising manganese(IV) oxide and solid alkali metal ion conducting polymer electrolyte material.

5. A method of making a secondary electrochemical cell comprising
   (i) assembling a solid state electrochemical cell having an anode containing lithium as active anode material, an electrolyte comprising a complex of poly(ethylene oxide) and a lithium salt, and a composite cathode comprising manganese (IV) oxide, electrolyte material comprising a complex of poly(ethylene oxide) and a lithium salt, and an electronically conducting phase;
   (ii) discharging the cell under conditions of elevated temperature in the range of 100° C. to 150° C. to convert the manganese (IV) oxide to LiMn$_2$O$_4$ having a spinel structure; and
   (iii) then recharging the cell.

6. A method of making a secondary electrochemical cell comprising
   (i) assembling a solid state electrochemical cell having an anode containing an alkali metal as active anode material, a solid alkali metal ion conducting electrolyte, and a cathode containing manganese (IV) oxide as active cathode material; and
   (ii) discharging the cell under conditions of elevated temperature in the range of 100° C. to 150° C. such that the cathode material is transformed in situ into a rechargeable cathode material.

7. A method according to claim 6 wherein the electrolyte comprises a complex of a solid polymer and alkali metal salt, which polymer is capable of forming donor-acceptor type bonds with alkali metal ions and is capable of conducting alkali metal ions.

8. A method according to claim 7 wherein the complex is a complex of a plastic macromolecular material and an alkali metal salt.

9. A method according to claim 6 wherein the cathode is constructed as a composite structure comprising manganese (IV) oxide and solid alkali metal ion conducting polymer electrolyte material.

10. A method of making a secondary electrochemical cell comprising
    (i) assembling a solid state electrochemical cell having an anode containing lithium as active anode material, an electrolyte comprising a complex of poly(ethylene oxide) and a lithium salt, and a composite cathode comprising manganese (IV) oxide, electrolyte material comprising a complex of poly(ethylene oxide) and a lithium salt, and an electronically conducting phase;
    (ii) discharging the cell under conditions of elevated temperature in the range of 100° C. to 150° C. to convert the manganese (IV) oxide into a second manganese compound; and
    (iii) then recharging the cell.

* * * * *